(12) United States Patent
Dhakshanamoorthy et al.

(10) Patent No.: US 12,333,622 B1
(45) Date of Patent: Jun. 17, 2025

(54) DYNAMIC DISPATCH OF RESPONDERS IN EMERGENCY RESPONSE

(71) Applicant: Mekdam CAMS, Doha (QA)

(72) Inventors: Nachinarkiniyan Dhakshanamoorthy, Doha (QA); Syed Taher Zama, Doha (QA); Anand Pandiyan Sathiyanarayanan, Doha (QA)

(73) Assignee: Mekdam Cams (QA)

( * ) Notice: Subject to any disclaimer, the term of this patent is extended or adjusted under 35 U.S.C. 154(b) by 0 days.

(21) Appl. No.: 18/420,258

(22) Filed: Jan. 23, 2024

(51) Int. Cl.
  *G06Q 10/06* (2023.01)
  *G06Q 10/0631* (2023.01)
  *G06Q 50/26* (2012.01)

(52) U.S. Cl.
  CPC ..... *G06Q 50/265* (2013.01); *G06Q 10/06311* (2013.01)

(58) Field of Classification Search
  None
  See application file for complete search history.

(56) References Cited

U.S. PATENT DOCUMENTS

| | | | |
|---|---|---|---|
| 11,395,124 B2 | 7/2022 | Rohde et al. | |
| 11,417,128 B2 | 8/2022 | Law et al. | |
| 11,841,946 B1 * | 12/2023 | Durvasula | G06F 21/53 |
| 2010/0231714 A1 | 9/2010 | Flores et al. | |
| 2019/0197369 A1 * | 6/2019 | Law | G06N 3/082 |
| 2019/0378397 A1 | 12/2019 | Williams Ii et al. | |
| 2020/0334470 A1 * | 10/2020 | Abeykoon | G06V 10/96 |
| 2020/0346751 A1 * | 11/2020 | Horelik | B64U 10/13 |
| 2021/0352460 A1 * | 11/2021 | Rohde | H04W 76/50 |

FOREIGN PATENT DOCUMENTS

| | | |
|---|---|---|
| CN | 115577892 A | 1/2023 |
| KR | 102340644 B1 | 12/2021 |
| WO | 2019/083442 A1 | 5/2019 |

\* cited by examiner

*Primary Examiner* — Alan Torrico-Lopez
(74) *Attorney, Agent, or Firm* — Lerner David LLP

(57) ABSTRACT

Aspects of the disclosed technology include techniques and mechanisms for the dynamic dispatch of responders in emergency response. A target environment may be monitored to determine whether one or more conditions that are present in the target environment correspond to conditions that were present during the occurrence of a previous incident event in a reference environment. The reference environment may be the same or similar to the target environment. Based on determining current conditions of the target environment are similar to conditions that were present during the occurrence of the previous incident event in the reference environment, a current incident event is detected within the target environment. An emergency responder is assigned to respond to the current incident event in the target environment based on a plurality of responder attributes.

24 Claims, 8 Drawing Sheets

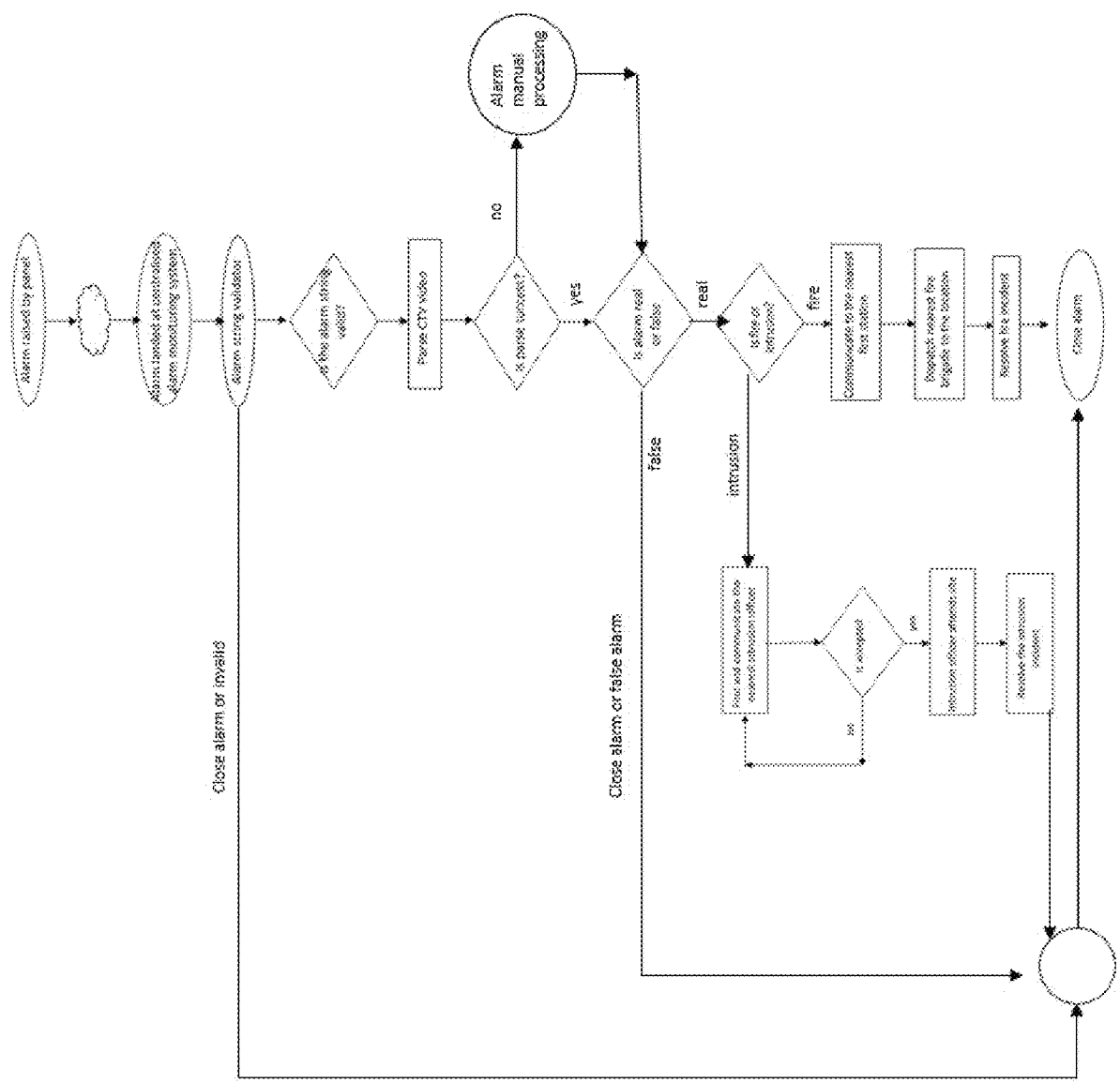

DYNAMIC DISPATCH OF RESPONDERS IN EMERGENCY RESPONSE

FIELD OF THE INVENTION

The invention relates to a system and method for dispatch of an emergency responder and, more particularly, to a system and method for dynamic dispatch of an emergency responder using artificial intelligence.

BACKGROUND

In modern urban environments, especially in large cities or small countries, the scope and complexity of maintaining safety and responding to emergencies have dramatically increased. Therefore, in emergency situations, matching responders with incidents efficiently is crucial for effective response.

Currently, responders are notified of an emergency situation from a dispatcher that has received a distress call. In such situations, the dispatcher will gather information about the incident, contact the appropriate responder and provide the relevant information to said responder. However, there are a number of issues with manually assigning tasks in this way. For example, delays in communication between a dispatcher and responder can lead to delays in the responder reaching the incident location. Additionally, errors in the communication can lead to inaccurate incident information being provided to the responder.

Further, managing real-time information about the responder, resources or incident event manually is time-consuming and prone to errors. This can result in the wrong personnel or resources being sent to the incident such that the response efforts are inefficient and ineffective. There is also a limited amount of time to provide responders with information in an emergency scenario which hinders their ability to respond in an optimal manner.

Other challenges occur when multiple incidents happen at once, for example in a large city, such that simultaneous assignment of responders to an incident event is required. As such, current methods of assignment are limited in scalability.

Due to the above-mentioned problems, there exists a need for a scalable system that efficiently allocates responders to incident events. Further, there exists a need for a system that provides a faster response time to incident events and provides a reduced latency in a network used to coordinate response to incident events.

SUMMARY OF INVENTION

According to a first aspect of the present invention there is provided a computer-implemented method for dispatch of emergency responders the method comprising: obtaining responder profiling data comprising attributes of at least a responder; obtaining real-time data derived from monitoring a target environment, the real-time data comprising an indication of at least a current condition of the target environment; obtaining historical incident data comprising an indication of at least a past condition of a reference environment, the reference environment corresponding to the target environment, wherein the historical incident data further comprises a warning condition of the reference environment, the warning condition being a past condition at which a past incident event occurred; identifying a current incident event in the real-time data when the current condition correlates with the identified warning condition of the reference environment; analysing the identified real-time data to obtain current incident data comprising information about the current incident event; assigning using a machine learning algorithm, according to the responder profiling data and the current incident data, a responder to the current incident event so as to facilitate an emergency response dispatch; and monitoring the current incident event so as to update the current incident data and updating the assigned responder based on the updated current incident data.

A responder may refer to an emergency responder individual or team such as emergency medical technicians and/or paramedics, firefighters, police officers, disaster response teams, volunteers, military personnel etc.

A target environment may refer to a particular geographical area or location (such as a building or outdoor area etc). Alternatively, the target environment may refer to a more specific location such as a room within a building.

The phrase "a reference environment corresponding to the target environment" refers to a reference environment that is similar to the target environment. For instance, a reference environment may refer to a category of environment such as a terrestrial environment, an urban environment etc that has similar characteristics to the target environment. In this way, by obtaining data from a reference environment with similar characteristics and features to that of the target environment, conditions can be identified that caused an incident event in this type of environment and that are likely to cause a similar incident event in the target environment.

A "current condition of the target environment" and a "past condition of the reference environment" may refer to an environmental condition of the corresponding environment. An environment condition refers to the state or characteristics of the environment and can include a physical, a chemical or a biological condition. A current or past condition of the environment may also or instead refer to a circumstance of the environment, for example it may indicate human activity in the respective environment, an open window in the respective environment or the condition of objects in the respective environment. Changes in these conditions can lead to an incident event, therefore, by obtaining conditions that have led to an incident event in a similar environment (i.e. the reference environment) in the past, a current incident event in the real-time data of the target environment can be identified quickly and efficiently.

To identify which conditions or change in conditions indicates or leads to an incident event, the obtained historical incident data comprises a warning condition of the reference environment, the warning condition being a past condition at which a past incident event occurred. In this way, the conditions that lead to incident events in the historical incident data are identified and an incident event can be predicted in the real-time incident data.

Given that the responder profiling data has been obtained and an incident event has been identified in the real-time data, a responder can be assigned based on this information to an appropriate incident so as to facilitate an emergency response. Specifically, the responders can be assigned based on their attributes and the current incident data, thereby optimising the assignment of responder to incident. In this way, the efficiency of dealing with incident events is improved, tasks are completed quicker, and resources are efficiently allocated.

Monitoring the current incident event and updating the assignment in real-time further improves the optimisation of the assignment, thereby conserving resources and using them appropriately. Therefore, the present method can enhance emergency response efforts, especially when responders are already stretched thin, improving overall emergency management and saving lives.

In some examples, the method further comprises assigning a past incident event type to the past incident event based on at least a characteristic of the warning condition; assigning an incident event type to the current incident event when the current condition correlates with the warning condition of the assigned past incident event; wherein the step of assigning a responder is further based on the identified incident event type of the current incident event.

The term "an incident event type" may refer to a category of incident such as a car crash, a fire, a medical emergency, a natural disaster etc. In one example, the past incident event may be a fire and the warning condition of the past incident event may be a rapid increase in temperature of the reference environment. This past incident event would therefore be labelled with a past incident event type of a "fire". Therefore, when the current condition of the target environment experiences a similar rapid increase in temperature, the current incident event is also labelled as a "fire". By identifying an incident event type, an appropriate responder can be assigned to the current incident event, thereby further optimising assignment.

In some examples, the attributes of the emergency responder comprise at least one of: a skill level of the responder, an experience level of the responder, an availability status of the responder, a type of emergency responder, a distance of the responder from the current environment, equipment available to the responder, qualifications of the responder, authorisations of the responder, and permissions of the responder.

A skill level of the responder may refer to the competency of the responder. This may include the competency of the responder at handling the given task type or set of task types of the incident event. An experience level of the responder may refer the experience a responder has facilitating a response to an incident event. This may refer to the number of tasks that the responder has attended to that are of a similar task type to the incident event, an amount of time exposed to said similar tasks, familiarity or competency with said similar tasks. Since the step of assigning an emergency responder-based attributes of the responder, this step is therefore further based on the above-mentioned attributes.

In some examples, the attributes of the responder comprise an availability status of the responder and the availability status of the responder is automatically updated in real-time.

Automatically updating the availability status in real-time may refer to the availability status being continually or periodically changed. For example, when a responder is assigned to an incident event, their status will be updated to "unavailable". Alternatively, if a responder completes an assignment or starts their shift, their status will be updated to "available". The status may be updated automatically using a GPS on the responder's phone which may set their status to "available" when in proximity to their workstation.

Real-time updates are important in emergency situations where accurate information is essential for analysis and assignment. In this way, the assignment of incident events to responders is further optimised by using real-time information on the availability of the responder.

In some examples, the step of obtaining real-time incident data comprises obtaining at least one of: video data of the target environment and sensor data of the target environment.

In some examples, the step of obtaining real-time incident data further comprises obtaining social media data relating to the incident event.

The social media data may include textual and/or visual data that is part of a post on a social media platform. In some examples, the method further comprises analysing the social media data so as to obtain real-time incident data. When analysing the social media data, natural language processing may be used to detect an increase in key words that may indicate an incident event. Analysing the social media data may include determining a geolocation of the incident event using location-related information embedded in the social media data. Analysing the social media data may include analysing images and videos of the incident event so as to determine a condition of the incident event.

In some examples, the real-time incident data is obtained using an Application Programming Interface (API). In some examples, the historical incident data is obtained using an API.

In some examples, the method comprises obtaining the real-time incident data by autonomous drone. In some examples, the autonomous drone may obtain real-time incident data, wherein the drone comprises a camera to obtain visual real-time incident data.

In some examples, the step of obtaining historical incident data comprises obtaining at least one of: video data of the reference environment and sensor data of the reference environment.

In some examples, the method further comprises identifying the warning condition in the historical incident data by analysing the historical incident data.

In some examples, the step of analysing the historical incident data comprises: training an artificial intelligence algorithm using the obtained historical incident data; validating the artificial intelligence algorithm using a validation data set, identifying, by the artificial intelligence algorithm, patterns in the historical incident data so as to determine a warning condition of the reference environment; inputting the real-time incident data into the trained artificial intelligence algorithm; and predicting, by the trained artificial intelligence, a current incident event in the real-time data.

The validation data set may be real-time incident data or any appropriate unseen data for validating the model. In some examples, the artificial intelligence algorithm is trained using one of: supervised learning and unsupervised learning.

In instances where the artificial intelligence (AI) algorithm is trained using supervised learning, the historical incident data is annotated manually or automatically. In this way, the training dataset is a labelled dataset. By learning to map input data to an output based on a labelled dataset, the AI algorithm can make predictions based on the real-time, unseen data. In instances where the artificial intelligence (AI) algorithm is trained using unsupervised learning, the historical incident data is not labelled. Examples of such algorithms include clustering algorithms (e.g. K-means and hierarchical clustering etc) which can group similar data points together.

In some examples, the artificial intelligence algorithm is at least one of: a K-Nearest Neighbour algorithm or an artificial neural network.

In some examples, the step of analysing the identified real-time data to obtain current incident data comprises using an artificial intelligence algorithm.

In some examples, the method further comprises: analysing the historical incident data to identify at least a past false incident condition of the reference environment, the false incident condition being a past condition at which an incident event was falsely identified; identifying a false incident event in the real-time incident data when the current condition correlates with the past false incident condition of the reference environment so as to prevent assignment of the responder or to alert an authority of the false incident event. An AI model may be used to carry out this method so as to verify that an alarm event is real. Different AI models may be used based on the type of incident event, for example, a fire or an intrusion.

A past false incident condition is a condition which has contributed to an incident event being wrongly identified in the past. By identifying a false incident event in the real-time data, the system can prevent unnecessary dispatch of emergency services, allowing them the responder to focus on real emergencies and the system allocates resources more efficiently.

In some examples, the method further comprises identifying an unverified incident event in the real-time incident data, the unverified incident being an event in which it is unclear whether the current condition correlates with the past false incident condition of the reference environment. In this way, an AI model is unable to verify the incident event. When an unverified incident event is identified, the method may comprise contacting a user. The user may be contacted by phone/SMS. In some examples the method may include receiving a verification that the unverified incident event is a real incident event or is not an incident event. A user may select an option on their phone to confirm that the alarm event is real or not real, for example using IVR input, so as to initiate sending a message to the system comprising this information. In some examples, if a verification is not received within a predetermined time period after contacting the user, the method may include identifying the unverified event is identified as real. For example, if the customer does not respond after three attempts to contact them, then the unverified incident event is treated as real, and a responder is dispatched. In this way, when the AI model is unable to verify that an event is real, then the alarm event may be processed manually to prevent the AI model inadvertently rejecting a real alarm event, and thereby endangering lives.

In some examples, the method further comprises: identifying a location of the current incident event, wherein the attributes of the responder include a location of the responder and the step of assigning is further based on the location of the current incident event and the location of the responder.

In some examples, the real-time incident data includes a geolocation of the target environment. In some examples, the real-time incident data is obtained from social media. In this way, a location of the current incident event may be identified using location tags or GPS data. In this way, the current incident data comprises a location which can be used to further optimise the assignment of responders to the incident event.

In some examples, the step of identifying a location of the current incident event comprises sending, by an addressable panel arranged in the target environment, a unique identifier associated with the addressable panel when the current condition of the target environment correlates with the identified warning condition; and identifying, using a database comprising locations of addressable panels and associated unique identifiers, the location of the addressable panel when the associated unique identifier is received. In some examples, the locations of the addressable panels comprises co-ordinates of the addressable panels, and the method further comprises sending the co-ordinates of the identified location of the addressable panel to the assigned responders. The database comprising locations of addressable panels may comprise GPS co-ordinates of the addressable panels or may comprise any appropriate location data about the addressable panels.

A unique identifier may be a distinct code assigned to an object at a specific location. Therefore, by receiving a unique identifier associated with a location of a current incident event a more precise location of the incident is obtained. This eliminates the issue of responders and response vehicles struggling to find the location of an incident, which has been a common problem in the past due to a lack of information on the exact location of the incident. With the exact location of the incident known, response vehicles can reach the location quickly and efficiently, saving valuable time in emergency situations.

In some examples, the addressable panels are connected via an Internet Protocol (IP) or Global System for Mobile Communications (GSM) connection. An IP connection is secure, and also further reduces latency in the network, since the panel is directly connected to the network, rather than being connected to the network via an intermediate Rx node.

In some examples, the method further comprises identifying a presence of an intruder in the current environment.

In some examples, the method further comprises using an artificial intelligence algorithm to assign an identity of an intruder to the intruder and alert an authority of the identity of the intruder.

AI algorithms can be trained to detect faces within footage. To identify an intruder, an AI algorithm may extract a face template and compare it with a database of known individuals. In this way, a criminal can be identified and arrested by authorities.

In some examples, the method further comprises obtaining traffic data and at least one of the step of assigning and the step of monitoring are further based on the traffic data.

The traffic data may include at least one of historical traffic data, real-time traffic data or predicted traffic data. The traffic data may comprise information about the traffic flow on at least one route the responder is predicted expected to take. In this way, a responder unlikely to incur traffic delays but is further away may be assigned instead of a responder that is closer by likely to be stuck in heavy traffic.

In some examples, the method further comprises the step of determining an importance of the identified incident event relative to other incident events, and wherein the step of assigning is further based on the determined importance.

In this way, the system can employ incident prioritisation. In this way, the responder is assigned to the incident events efficiently so as to resolve incidents based on their urgency. As such, incidents that require immediate attention may be allocated to the nearest responder capable of dealing with the incident, while a less urgent incident may be assigned a responder required to travel a greater distance to the event.

As new incident events are identified, their urgency will be assessed and prioritised accordingly. The assignment of the responder can then be updated accordingly by the system.

In some examples, the method further comprising monitoring the progress of the assigned responder.

In some examples, the method further comprises sending an alert to the assigned responder including at least a portion of the current incident data.

In this way, the responder will be equipped with relevant information about the incident event such that they are aware of the situation before or on arrival.

In some examples, the method further comprises generating a response plan based on the current incident data.

The response plan may comprise a workflow model. A workflow model may refer to a sequence of tasks that the responder is recommended to carry out in order to resolve the incident event. Using the current incident data to generate and devise a response plan allows for specific details and information on the incident event to be accounted for in the response plan. In this way, the method improves efficiency, enhances productivity and reduces errors.

In some examples, the method further comprises generating at least one of one or more reports comprising analytics of the incident event response.

In some examples, the method further comprises sending an alarm message to users, the alarm message comprising at least a portion of the current incident event data. The term "users" may refer to citizens proximal to the incident event, or it may refer to security managers at the location of the incident or it may refer to any other authorities. In some examples, the method further comprises sending the alarm message to a central control centre. The control centre is connected to multiple response units, so provides a wide area of coverage. The alarm message could be an email, a WhatsApp message, and SMS, or any other kind of push notification. For example, the message may comprise the incident type and/or location of the incident event so as to warn citizens nearby of the incident event.

Such reports are useful for post-incident analysis and improvement of emergency response strategies.

According to a second aspect of the present invention there is provided a computer-readable storage medium comprising instructions which, when executed by a processor, cause the processor to carry out the method steps performed by the one or more remote processors according to any of methods described herein.

According to a third aspect of the present invention there is provided a system for dispatch of emergency responders, the system comprising: a responder profiling module configured to obtain responder profiling data comprising attributes of at least a responder; a real-time incident information module configured to obtain real-time data derived from monitoring a target environment, the real-time data comprising an indication of at least a current condition of the target environment; a historical incident data module configured to obtain historical incident data comprising an indication of at least a past condition of a reference environment, the reference environment corresponding to the target environment; the historical incident data further comprises a warning condition of the reference environment, the warning condition being a past condition at which a past incident event occurred; an event identifying module configured to identify a current incident event in the real-time data when the current condition correlates with the identified warning condition of the reference environment; the event identifying module further configured to analyse the identified real-time data to obtain current incident data comprising information about the current incident event; a machine learning module configured to assign, using a machine learning algorithm, according to the responder profiling data and the current incident data, a responder to the current incident event so as to facilitate an emergency response dispatch; and a monitoring and adaptation module configured to monitor the current incident event so as to update the current incident data and update the assigned responder based on the updated current incident data.

In some examples, the historical incident data module further configured to analyse the historical incident data to identify a warning condition of the reference environment, the warning condition being a past condition at which a past incident event occurred.

In some examples, the system is a modularised system.

In some examples, the historical incident data module is further configured to analyse the historical incident data to identify a warning condition of the reference environment, the warning condition being a past condition at which a past incident event occurred.

In some examples, the system further comprising at least an autonomous drone configured to obtain real-time incident data.

In some examples, the system further comprising an addressable panel arranged in a target environment. The addressable panel may comprise one or more of: a sensor and a camera.

In some examples, the system further comprising a plurality of addressable panel each arranged in a target environment.

In some examples, the addressable panel is configured to send an associated unique identifier to the real-time incident data module when the current condition correlates with the identified warning condition; and wherein the real-time incident information module further comprises a database of locations of the addressable panels and the associated unique identifiers such that the real-time incident information module identifies the location of the panel when the associated unique identifier is received.

In some examples, the database is automatically updated when a location of an addressable panel changes.

In some examples, the real-time incident data module and the addressable panel are connected to a network by at least one of: Internet Protocol, IP, and Global System for Mobile Communications, GSM.

In this way, the real-time incident data module and the addressable panel are capable of sending and receiving data packets using an IP protocol, which provides internet connectivity. Further, the real-time incident data module and the addressable panel being connected via GSM means that it utilising cellular networks to provide a wireless communication link. In this way, GSM provides internet connectivity and communication between the network. As such, a secure and reliable connection is provided by the system.

In some examples, the system is configured for integration with an external system using API. The system offers API access to the software, allowing for seamless integration with other systems. This opens up the possibility of integrating with other security systems such as access control systems and video surveillance systems. This integration can result in a more comprehensive security solution, as the network system can provide a unified view of all security incidents and events.

BRIEF DESCRIPTION OF DRAWINGS

FIG. 7 schematically illustrates a flowchart of an exemplary method according to the present invention.

DETAILED DESCRIPTION

It is important to dispatch an emergency responder to an incident event quickly and efficiently. As urban environments continue to evolve, the present system described herein stands as a modern, holistic, and indispensable tool for ensuring the safety and security of communities at both macro and micro levels. The present system can provide a profound impact on emergency response frameworks across large cities or small countries.

The present system automatically assigns emergency services for dispatch by obtaining real-time data derived from monitoring a target environment, training an artificial intelligence (AI) model using historical incident data comprising conditions of a reference environment, applying the AI model to the real-time data so as to predict an incident event and assigning an emergency responder to the incident event so as to facilitate an emergency response.

Figure 1:
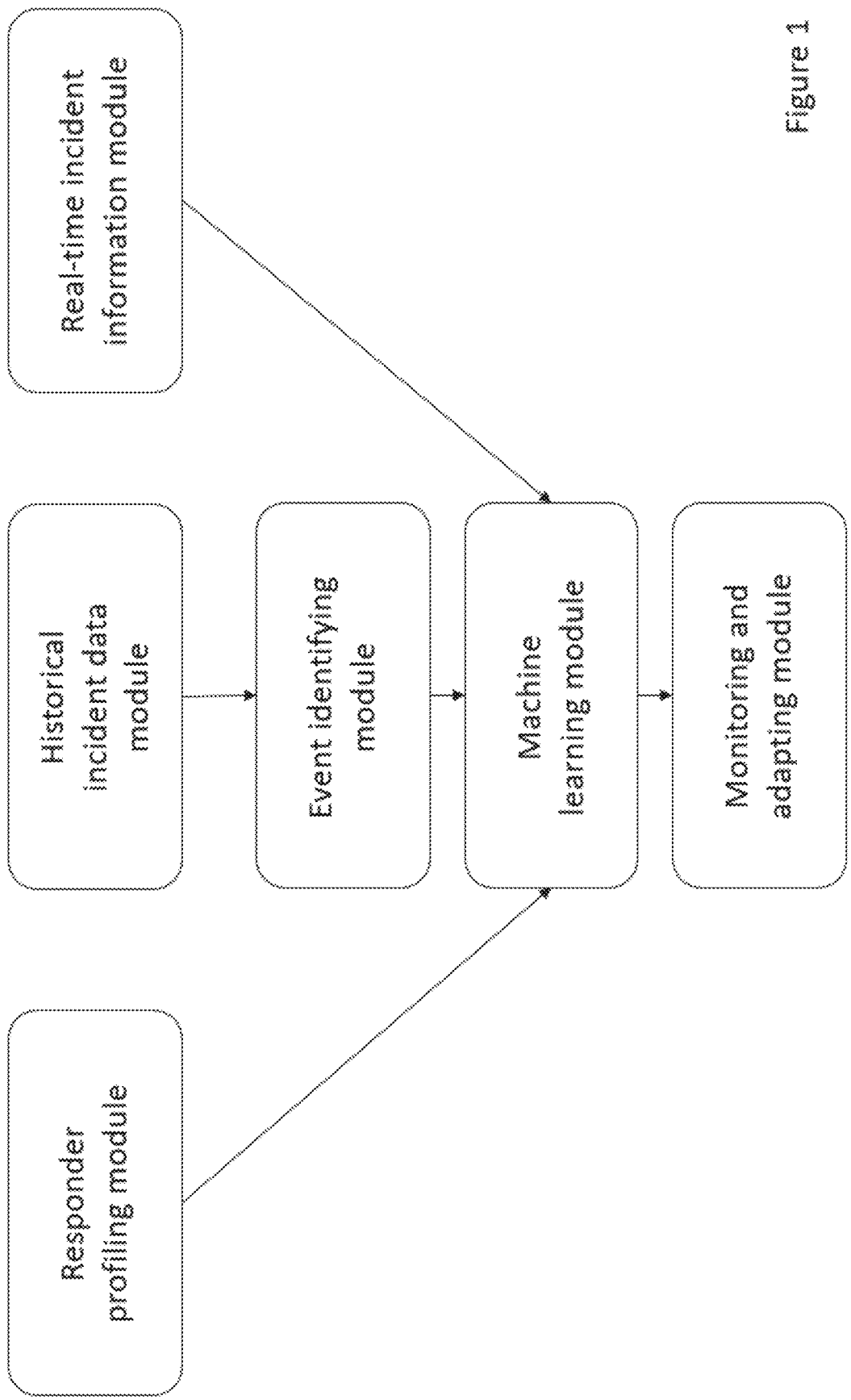
FIG. 1 schematically illustrates a task assignment system according to the present invention.

FIG. 1 is a block diagram illustrating a system according to the present invention. The system comprises a responder profiling module, a historical incident module, a real-time incident information module, an event identifying module, a machine learning module, and a monitoring and adapting module. The system may include one or more computer processors comprising the above-mentioned modules. Alternatively, separate computer processors may comprise each module. In some examples, the one or more computer processors are coupled via a wired or wireless connection. The system may additionally comprise a memory and power supply.

The real-time incident information module is configured to obtain real-time incident data derived from monitoring a target environment in real-time. The real-time incident data comprises an indication of at least a current condition of the target environment. The real-time data can be collected and derived from various sources and may be obtained in any of the ways described herein.

For example, the real-time incident information module may be capable of obtaining real-time incident data from a sensor arrangement. The real-time incident information module may be adapted to obtain real-time data directly or indirectly therefrom. In some examples, the sensor arrangement comprises one or more of intrusion sensors, heat sensors, image sensors, pressure sensors etc. The real-time incident information module may be configured to derive physical or environmental parameters of the target environment based on readings obtained from the sensor arrangement.

In some examples, real-time incident information module may be capable of obtaining real-time incident data from one or more of cameras (e.g. thermal cameras, surveillance cameras etc). The real-time incident information module may be configured to analyse the visual data from one or more of cameras to derive the current condition of the target environment. For example, the real-time incident information module can use AI model(s) trained to classify conditions of an environment based on historical data to derive the current condition of the target environment from the visual data.

In some examples, the real-time incident information module may be capable of obtaining real-time incident data from other systems such as a fire detection system and/or an access control system. For example, third party systems can be integrated with the system using an Application Programming Interface (API). The system may be integrated with existing CCTV systems. In this way, there is no need to install additional cameras onto a premises since footage from existing cameras can be obtained and used by the present system.

The real-time incident information module may be capable of obtaining additional relevant data including measurements of other variables that may cause or affect an incident event, such as contextual information including dimensions of the environment, timings etc.

Preferably, the sensors and/or cameras and/or other systems are arranged appropriately in the target environment so as to obtain measurements of the target environment from which a condition of the target environment can be precisely and accurately derived.

Figure 2A:
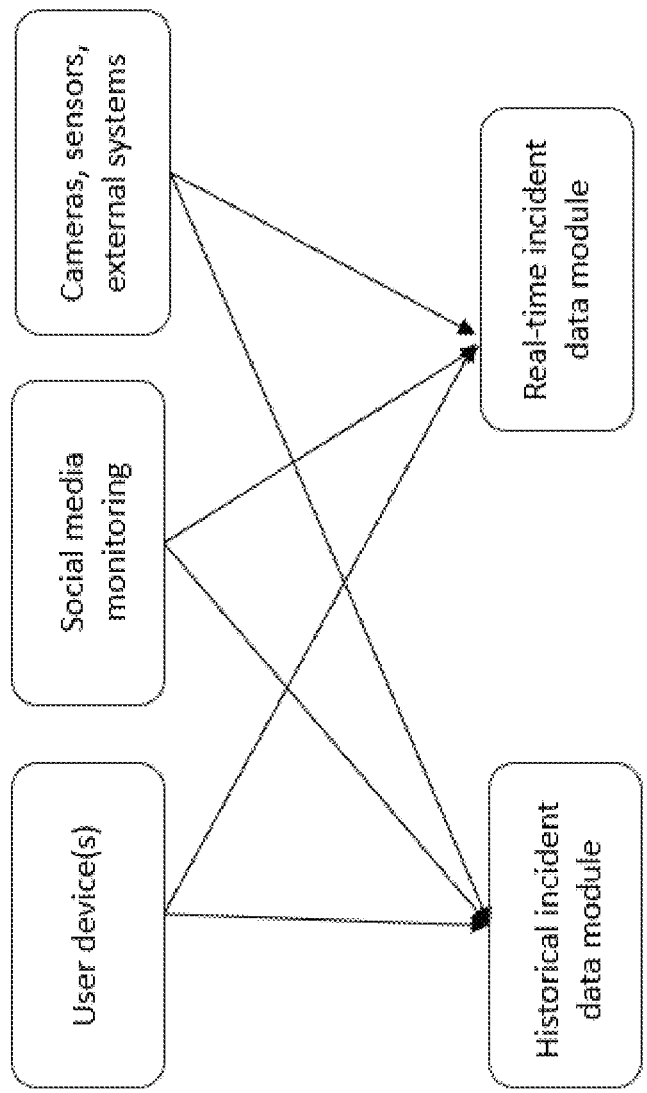
FIGS. 2A and 2B schematically illustrates a task assignment system according to the present invention.

In some examples, the real-time incident information module obtains real-time incident data from social media platforms, as shown in FIG. 2A. For example, often when an incident event occurs, updates will be shared by users on a social media platform. In a specific example, a large-scale fire breaks out in a multi-story residential building in a densely populated city. Within minutes, residents and bystanders may start posting images and videos of the fire on social media with location tags and hashtags such as #fire, #emergency, and #help. By monitoring and analysing these social media posts, the system can assign a responder to the incident event promptly, ensuring public safety and minimizing potential risks.

To aggregate data from social media platforms, the real-time incident information module may be configured to monitor various social media platforms such as Twitter™, Facebook™, Instagram™, and Reddit™. APIs and web scraping tools (i.e. programs which automatically extract and process data from websites) can be used to continuously or intermittently gather posts, comments, and media content in real-time from social media.

The real-time incident information module may further utilise a natural language processing (NLP) engine to process textual data obtained from the social media platforms. For example, the NPL engine can perform sentiment analysis, topic modelling, and keyword extraction to understand the context of the posts and identify relevant information regarding the incident event. In the example of a large-scale fire, the NLP engine can detect a surge in the usage of keywords like "fire" and "emergency" within a specific geographic location. Further, by analysing location tags, GPS data, and other location-related information embedded in social media posts, the system can determine the geographical location of reported incidents, aiding in pinpointing the exact location of incident events. The system may further analyse the social media post to deduce the type of incident event and severity of the incident event.

The real-time incident information module may be configured to filter out irrelevant data and verify the information obtained through social media. For example, the social media data can be cross-referencing with other sources. Alternatively, or additionally, patterns from multiple social media posts can be analysed by an AI model to assess credibility and relevance.

Deep learning algorithms can be employed to analyse images and videos posted on social media platforms and to detect visual signs of an incident event. In the example of a fire or intrusion event, smoke, flames, or suspicious activities, can be detected by the algorithms and the relevant metadata from these media files is extracted by the system.

In the realisation of a credible and urgent incident from analysing the social media data, the system assigns a responder to the incident and/or to trigger a real-time alert. For example, the system may alert and assign a local fire department to respond to a fire incident, allowing them to swiftly dispatch fire trucks and emergency response teams. The alert can contain information regarding the type, location, and severity of the incident.

Further, social media can be continually monitored for updates. The real-time information from social media can then be sent to the emergency response teams. In a specific example, this may allow the responder to know which floors are most affected, if there are people trapped, and what routes might be best for evacuation.

By promptly detecting and verifying the fire through social media analysis, emergency services are able to respond more quickly than they would have through convention means, ultimately saving lives and reducing property damage. Social media monitoring and analysis proves to be critical in ensuring a rapid and informed response to the emergency.

Moreover, real-time incident data can be obtained by citizens actively participating in emergency response efforts during incident events. As such, the real-time incident information module may be configured for communication with user devices. The system therefore promotes community engagement, enabling faster information sharing and coordinated responses.

In instances when the system obtains data relating to individuals, it is advantageous for the system to additionally ensure the security and privacy of individual users' data. As such, the system may employ techniques such as differential privacy, secure multi-party computation, and trusted execution environments to protect user data while enabling useful analysis. The system therefore maintains public trust and cooperation by safeguarding privacy, indirectly contributing to saving lives during fire incidents or intrusions.

Differential privacy is an algorithmic technique that ensures the privacy of individual data in a dataset. This component adds a carefully calibrated amount of random noise to the data queries, ensuring that the output remains statistically relevant while preserving individuals' privacy. Therefore, the system may be configured to apply this technique to any of the obtained real-time data in order to ensure security and privacy.

A Secure Multi-party Computation (SMC) may be used to allow the system to compute functions and analyse data that is distributed across multiple sources without requiring access to the raw data. This ensures that data can be analysed in a decentralized manner, without compromising the privacy of the individuals whose data is being processed.

In some examples, the data may be encrypted and then analysed without being decrypted. This ensures that the system can make useful inferences and decisions based on the data without exposing sensitive information. In some examples, data masking may be used. Data masking involves the alteration of data so that it remains structurally identical but holds no value. For example, real identities could be masked as they are stored, allowing for behavioural analysis without identifying individuals.

In some examples, tokenization may be used and involves substituting sensitive data with non-sensitive equivalents, or tokens. This can be useful, for example, in protecting the addresses or identities of individuals in a building. In some examples, only authorized personnel and subsystems have access to the data. This aids in maintaining the integrity and confidentiality of the data. In some examples, the system only collected and processes the minimum necessary data. This reduces the risk of sensitive information being exposed or misused.

As shown in FIG. 1, the system further comprises a historical incident data module. The historical data comprises an indication of at least a past condition of a reference environment. In some examples, the historical data is derived from previous monitoring of a reference environment (i.e. monitoring a reference environment at a past time). The reference environment refers to the same or a similar environment to the target environment. For example, the target environment may be an office building while the reference environment is the same or a similar office building. The historical data is used to train predictive models which can then be used to predict future incident events from the real-time incident data.

Figure 3:
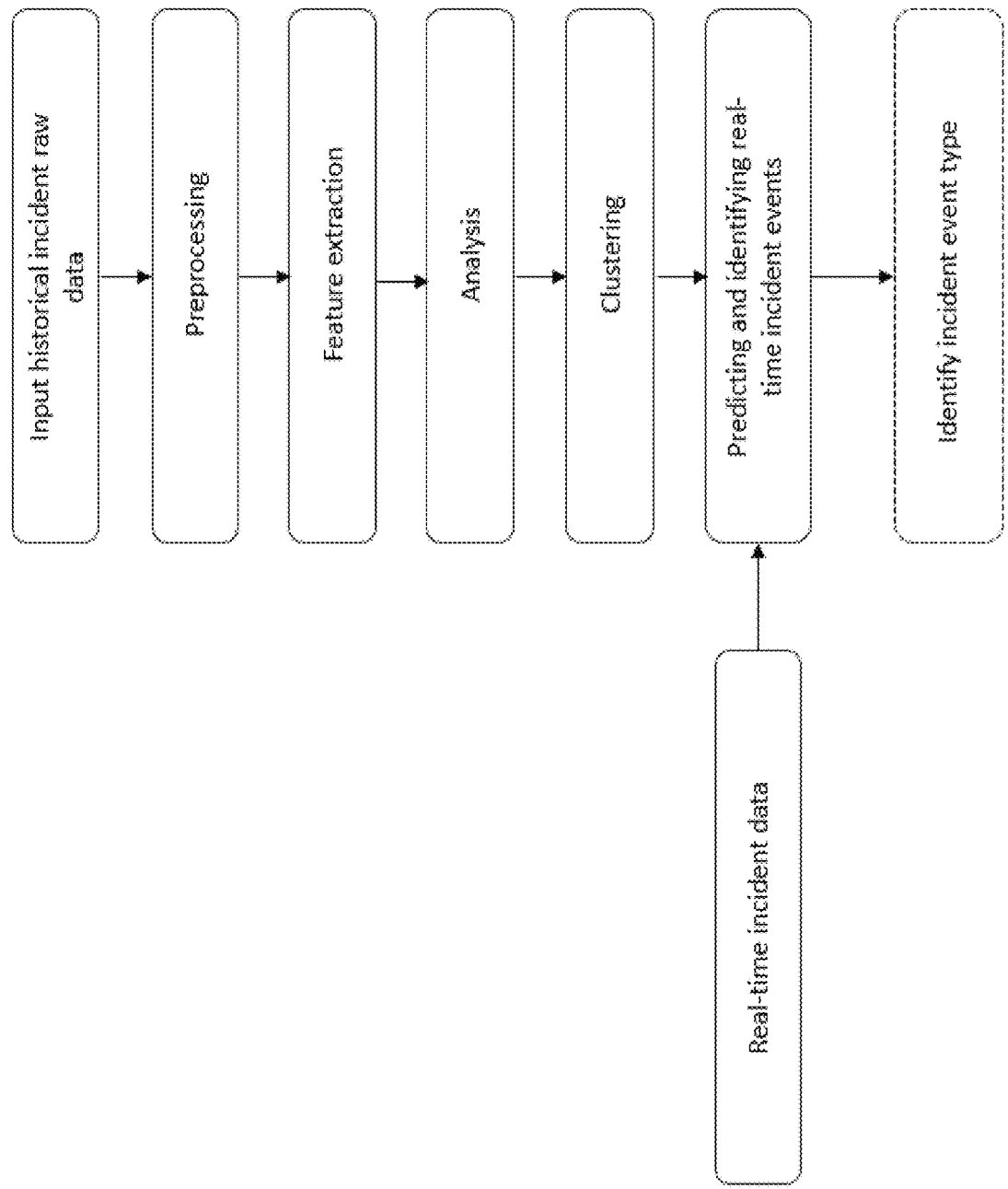
FIG. 3 schematically illustrates a flowchart of an exemplary method according to the present invention.

FIG. 3 shows a flow diagram of an exemplary method for training an AI model carried out by the historical incident data module. As shown, the historical incident data module obtains historical incident data. This may be obtained using one or more of: a sensor arrangement, one or more of cameras (e.g. thermal cameras, surveillance cameras), fire detection systems and access control systems in a similar manner to obtaining the real-time incident data described above.

Before analysis of the historical incident data, the historical incident data module can preprocess the obtained historical data to transform it into a useable format for training the predictive model. For example, the obtained historical incident data may be cleaned and standardised, removing noise and inconsistencies.

In examples where the historical incident data includes images, image and video analysis techniques can be used during preprocessing. For example, the collected video and image data from the one or more cameras can undergo preprocessing to improve the quality of the image(s). Techniques such as noise reduction, contrast enhancement, and geometric normalization can be employed to correct variations in illumination, pose, and scale, making the images suitable for identification and classification of the items or people in the footage.

The historical incident module is further configured to identify and extract relevant features and patterns from the historical incident data. The term "features" refers to characteristics of the historical incident data that represent the most important aspects of the data. In image analysis, features can include colour or gradient distributions found in the images. In sensor analysis, features can include reading frequencies or mean/median sensor readings values. Feature extraction may be carried out manually, or automatically by using neural networks able to learn and identify features in the data. By carrying out feature extraction on the historical incident data, a training dataset is provided which can be used by the system to train the predictive model.

The historical incident module uses a predictive model or statistical analysis technique to analyse the training dataset obtained from the historical incident data. In this way, the training dataset is analysed using statistical or AI algorithms so as to identify patterns in the data. The type of model or technique may be chosen based on the type of data to be analysed. Examples of such algorithms include decision trees, neural networks, or support vector machines.

In some examples, the system uses algorithms to organise the data into groups, with each group having similar attributes. Specifically, a machine learning clustering algorithm may be used. Clustering is an unsupervised learning technique that is used to group together similar data, without assigning a specific label to the data. In examples where the obtained historical incident data includes images, clustering can be used to group similar images together, to identify regions of interest in an image. It may also be used as a preliminary object discovery tool and/or to identify patterns or anomalies in the data. Similarly, when the historical incident data comprises sensor readings, clustering can be used to group similar sensor readings together and identify anomalies in the sensor data.

Features contribute to the clustering of the data, therefore, by analysing the clusters, features associated with an incident event can be identified. A specific cluster may relate to a specific event type, which can then be identified as a specific incident event type. In one example, a specific cluster may comprise sensor readings above a threshold sensor level indicating that an event type occurs when a sensor reading surpasses this threshold. This event type can be identified as a fire event. Therefore, detecting a temperature increase to above this threshold can indicates a fire. In another example, unauthorized access at unusual times can signify an intrusion.

Once a predictive model is trained using the training data, the model can be validated using a validation data set in order to assess the model's performance. Once validated, the model can be used to make predictions of future incident events based on the real-time, unseen data.

Specifically, the obtained real-time incident data may be input to the trained predictive model, as shown in FIG. 3. The model may then identify a current condition in the real-time data as correlating with a past condition that has been identified by the model as causing an incident event in the past. The model then identifies this as a potential incident event.

In a specific example, the historical incident data may pertain to the temperature of the room, the oxygen supply to the room and the fuel available to the room. Such data may be obtained using heat sensors, oxygen sensors, cameras etc. Once the historical incident data has been pre-processed, conditions in which a fire has occurred are identified and extracted. For example, the temperature and oxygen levels in the room at the time of or around the time of the fire can be identified and extracted as an indicator of a fire event. The predictive model is trained using this data such that the model can predict future fire events based on patterns in the historical fire events. Therefore, if the current conditions in the real time data correlate or are proximal to the past conditions identified as an indicator of a fire, the event identifying module shown in FIG. 1 will predict a fire event is occurring or is about to occur in the real-time data.

The system can also use algorithms and techniques to discern and filter out false alarms. Specifically, by utilising AI models, the real-time data from sensors can be compared with obtained historical sensor data so as to make a determination regarding the authenticity of the alarm.

Figure 4:
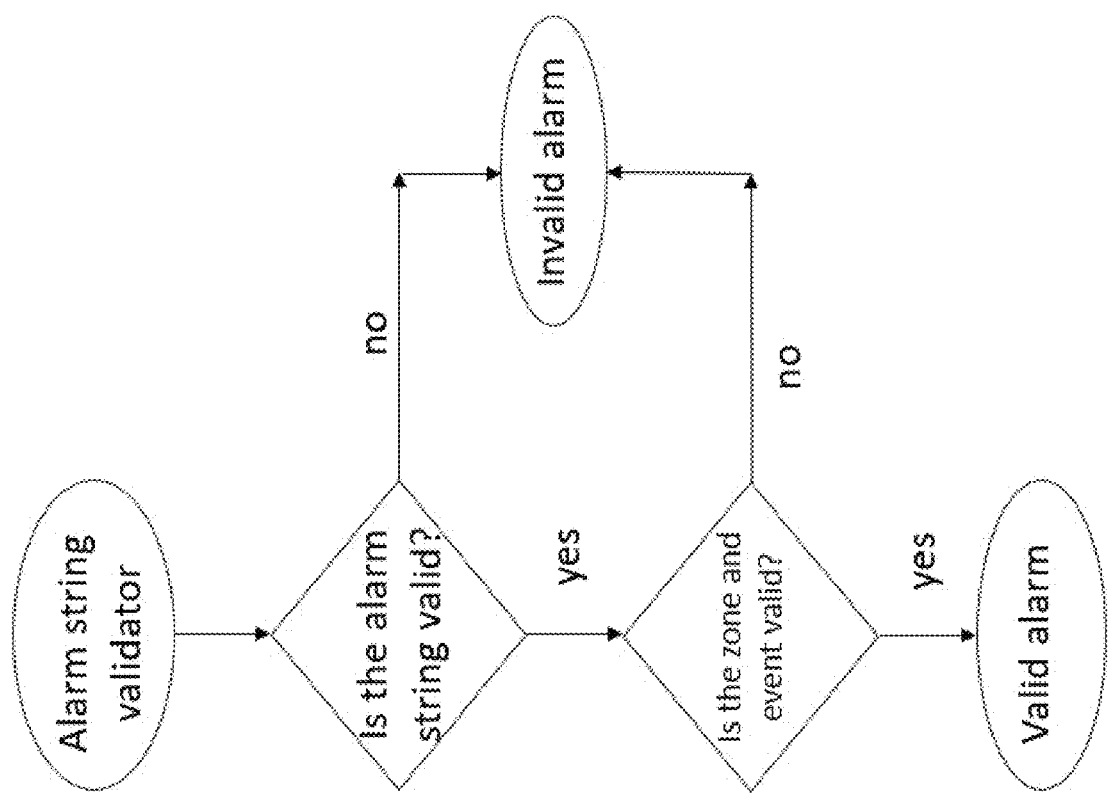
FIG. 4 schematically illustrates a flowchart of an exemplary method according to the present invention.

FIG. 4 shows a flow diagram of an alarm string validator. Upon an alarm event triggering, the alarm event is initially validated as illustrated in FIG. 4 to ensure the alarm event and zone codes are valid, and the triggered alarm is not a false event. Once validated, the assignment of a responder can be fully automated without the need for human intervention.

In an example, the historical incident data includes conditions that could contribute to false alarms, such as weather conditions, ambient noise, and temperature. Conditions that led to false alarms are identified from this historical incident data by the system using algorithms described herein. These may be identified by using records of previous false alarms and other attributes that contributed to their falseness. Machine learning algorithms such as decision trees, support vector machines, or neural networks can be trained using the historical incident data as training data. Real-time data of a target environment may then be obtained from various sensors such as smoke detectors, motion sensors, and intrusion alarms. Using the trained predictive model, the real-time incident data can be evaluated and classified as either genuine or false.

The algorithm can output a confidence score for the classification, reflecting the likelihood that the alarm is genuine or false. A threshold is selected that above which an alarm should be treated as genuine or below which the alarm should filtered out as false. For example, only if the confidence score is above a certain threshold, the identified incident event is considered genuine. The system may additionally collect feedback on the accuracy of the model's decisions and uses this feedback for continuous optimisation of the model. The decision may be communicated with the emergency response systems. By identifying false alarms, the system provides further reductions in the time taken to dispatch responders to the site of alarm when the model is confident that the alarm event is real.

One specific example includes obtaining data from a motion sensor in a secure facility. The motion sensor may be triggered late at night. Additional information such as the night's weather conditions is also collected by the system. This data is fed into an AI model trained on historical incident data pertaining to intrusion events in a reference environment. The model outputs a classification of the event as genuine or false and assigns a score to the AI engine's decision. The decision is compared against a pre-determined threshold and if the system determines with high confidence that it's a false alarm (e.g., triggered by a small animal), it will filter out the alarm and avoid dispatching security personnel. If it was a genuine alarm and was attended to, the data is collected to then be used as historical incident data.

Therefore, the system can prevent unnecessary dispatch of emergency services, allowing them to focus on real emergencies and use their resources more efficiently.

Figure 5:
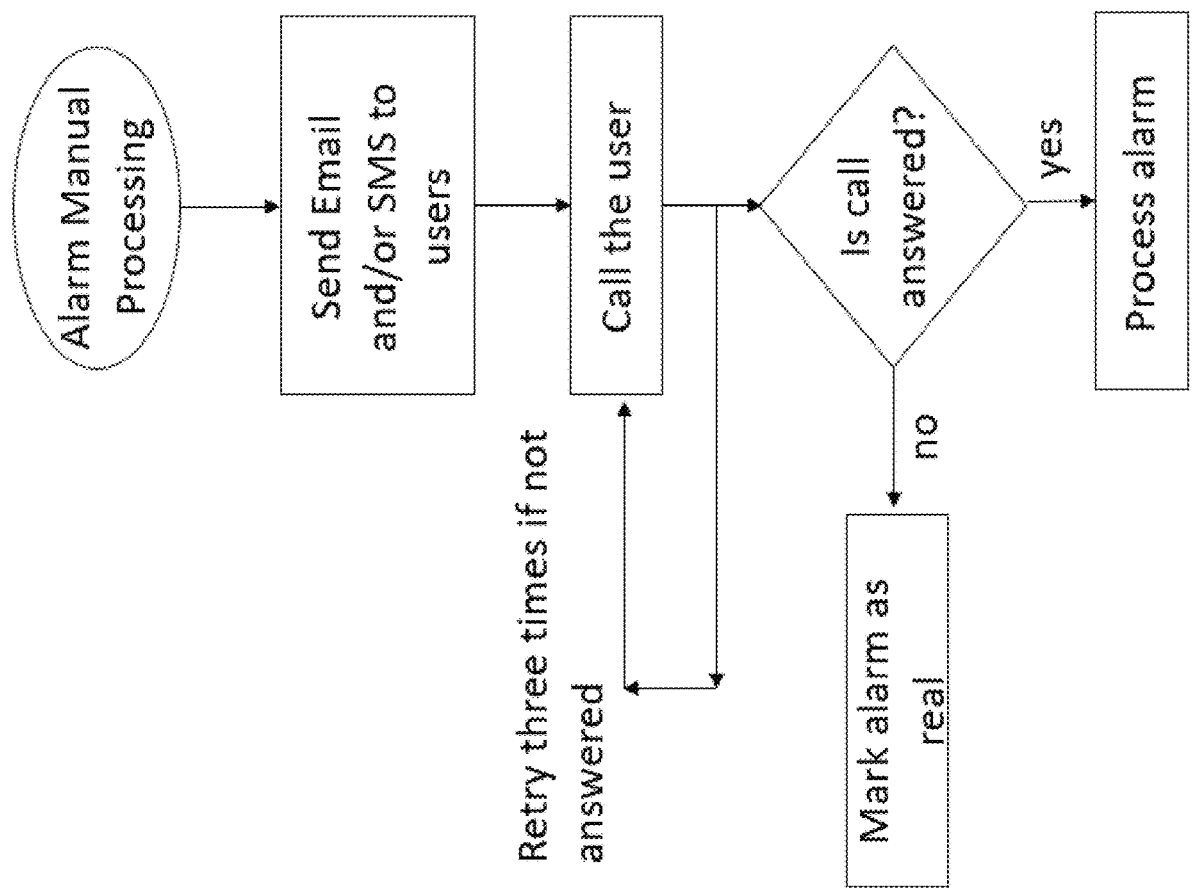
FIG. 5 schematically illustrates a flowchart of an exemplary method according to the present invention.
Figure 6:
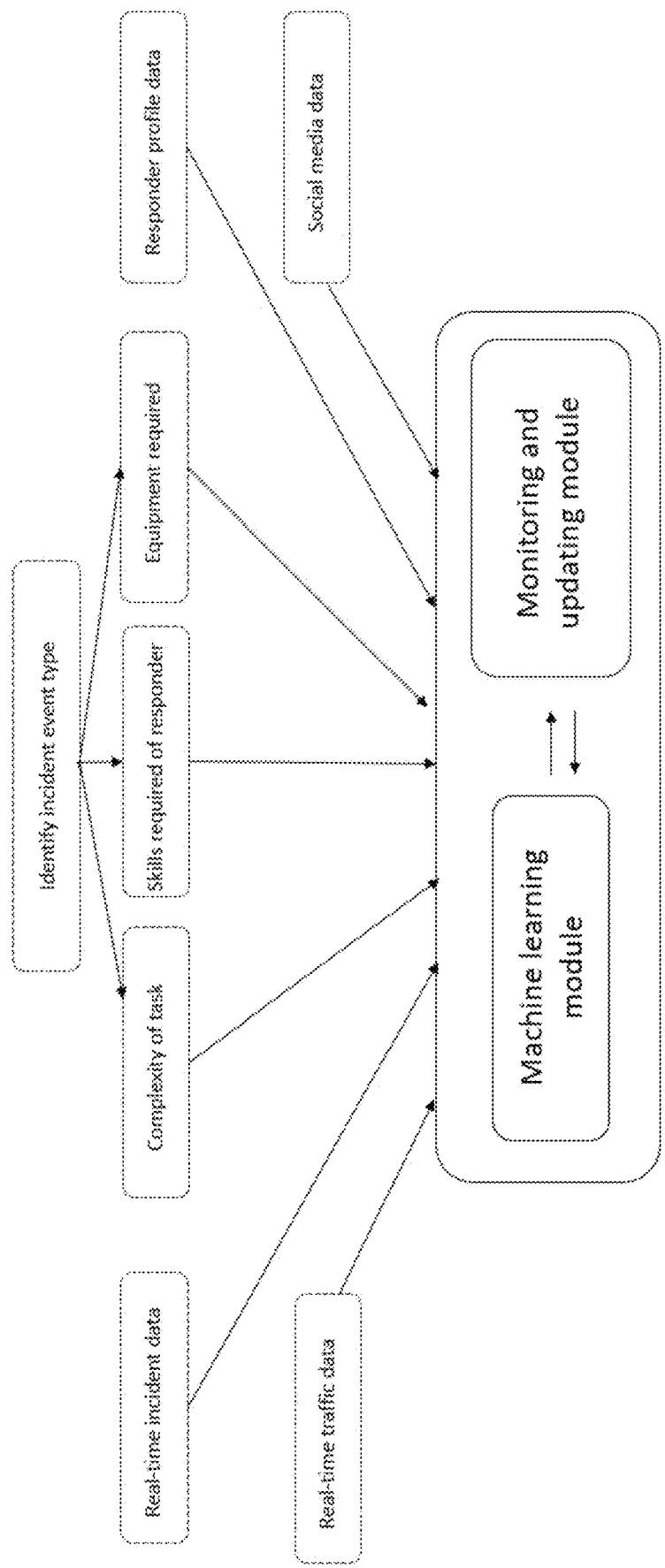
FIG. 6 schematically illustrates a task assignment system according to the present invention.

If the model is unable to verify an alarm event, then it may attempt to contact a user via phone/SMS, as shown in FIG. 5. The user may select options on their phone to confirm that the alarm event is not real. For example, using IVR input. However, if the customer does not respond after three attempts to contact them, then the alarm event is treated as real, and emergency services are dispatched. As an added safety feature, if the model is unable to verify that the alarm event is real, then the alarm event may be processed manually to prevent the model inadvertently rejecting a real alarm event, and thereby endangering lives.

The system can be configured to identify unauthorised individuals during intrusion events. By comparing real-time video data from surveillance cameras with a database of known individuals, the system facilitates faster and more accurate identification, improving the security response. It provides real-time alerts to security personnel, enabling timely actions to mitigate the threat.

In an example where the system carries out video analytics, the real-time incident module is configured to collect video and image data from one or more surveillance cameras. High-resolution cameras with night vision capabilities are preferably used to ensure quality data acquisition under different environmental conditions. As described above, the system can preprocess the images to improve the quality and making the images more suitable for facial recognition. A model can then be used by the system to identify human faces within the images.

The system then utilises algorithms such as Haar cascades or deep learning models (e.g., Single Shot MultiBox Detector) to accurately localise faces. For example, a deep learning algorithm may have been trained using a labelled database of facial images, the images being in different environments and including different ages, races, gender etc. The algorithm is trained by extracting distinguishing features from the detected faces. This can be done using techniques such as Local Binary Patterns (LBP), Eigenfaces, or deep learning models like VGGFace or FaceNet. The algorithm extracts a set of numeric values representing the unique characteristics of each face. The extracted features are then compared with a database of known faces. The system can utilises algorithms such as k-Nearest Neighbors (k-NN) or Support Vector Machines (SVM) to perform matching.

An algorithm then makes decisions such as whether an individual is authorized to be in the premises. If an unauthorized individual is detected, especially during a fire or intrusion event, notifications are sent to security personnel or emergency responders.

In order to dispatch a well-suited and appropriate responder to an incident event, the system additionally obtains attributes of a responder. Using data of the identified incident event and responder profiling data, responders can be appropriately dispatched based on their attributes and information about the incident event.

As shown in FIG. 1, the system comprises a responder profiling module. The responder profiling module is configured to obtain responder profiling data comprising attributes of at least a responder. In some examples the responder profiling module may be configured to receive responder profiling data via a wired or wireless connection to a user input device. Relevant information about the responder(s) may be input via a user input device.

In some examples, the responder profiling module is configured to obtain responder profiling data from a database.

Figure 2B:
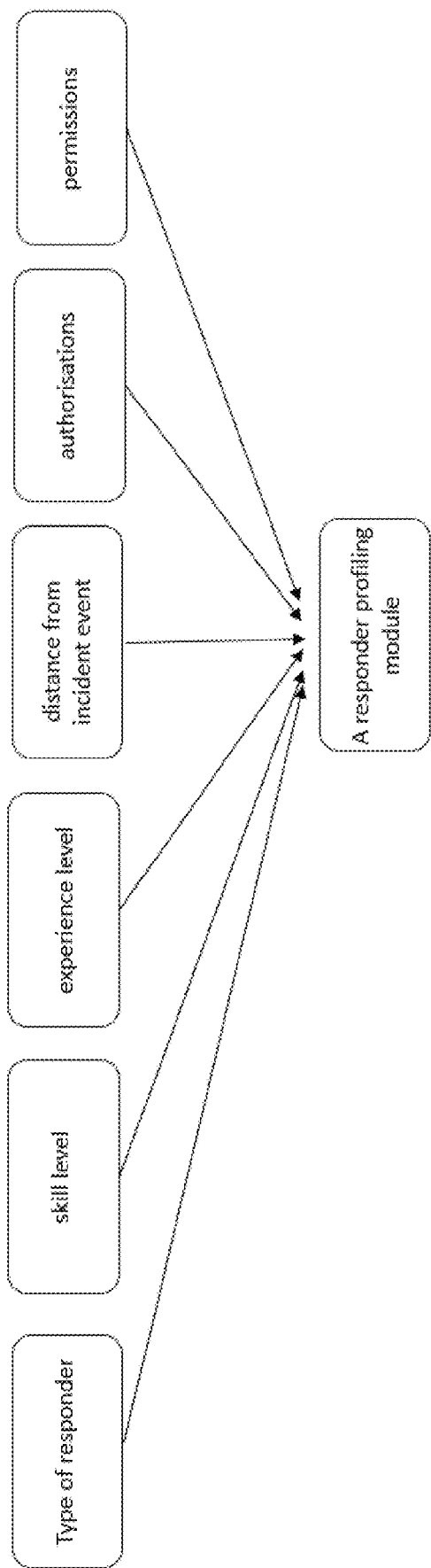

As shown in FIG. 2B, the attributes of the responder may refer to one or more of: the type of emergency responder, a skill level, an experience level, a distance from the incident, equipment available, qualifications, authorisations and permissions of the responder.

For attributes that change infrequently, such as qualifications and authorisations, it is advantageous to obtain this information from a database comprising information about the responder(s). For attributes that tend to change at a high frequency, such as equipment available and distance from the incident event, these can be updated and obtained by the responder profiling module in real-time manually and/or automatically. For example, the responder may be associated with a GPS sensor, and therefore the location and distance of the responder from the incident can be updated in real-time by transmitting data obtained by the GPS sensor to the responder profiling module.

As shown in FIG. 1, the system further comprises a machine learning model configured to assign, using an artificial intelligence algorithm, according to the responder profiling data and the current incident data, a responder to the current incident event so as to facilitate an emergency response.

Once an incident event is identified, the incident may be categorised into an incident event type. The categorisation may include the nature of the incident, the complexity to resolve the incident, the skills required of the responder etc. As such, the system has knowledge of which type of incident requires which type of attributes from a responder. Therefore, by considering the category of the event and the responder's attributes (e.g. their skill level, availability, equipment available), the most suitable responders can be employed to attend to the incident, thereby providing efficient and effective emergency response.

In more detail, an artificial intelligence algorithm can consider the attributes of the incident and of the responders to assign the incident to a responder. Algorithms may use predefined rules and constraints to assign the incident with the responder. For example, if the incident is a fire that requires a hose to extinguish the fire, a responder in possession of a hose will be assigned to the incident.

In other examples, an optimisation algorithm may be used to optimise resource allocation, to balance the workload across responders and to minimise time to the incident and minimise completion time. The AI model can be trained using historical data of assignments to further optimise the assignment of tasks. Such a model may consider previous response times and complexities. In some examples, the AI model is able to prioritise some incidents over others. For example, a fire with multiple citizens trapped may be prioritised over a home invasion with minimal risk to life. In some examples, the AI algorithm may prioritise assignments based on preferences of the responders.

Further, the system can use multiple strategies such as first-come-first-served, market-based allocation, and hierarchical distribution algorithms for task assignments. The mechanism considers the suitability and urgency of tasks, and resources bid for tasks based on these parameters. The highest bidder is assigned the task.

Information and instructions about the assignment can be relayed to emergency responders, resources, and the public, if necessary.

Further, the system comprises a monitoring and adaptation module that monitors and adapts the dispatch in real-time. In this way, the system can adapt to changes in circumstances such as the task requirements based on, for example, responder availability. In some examples, adjustments to priority of tasks can be made based on changes in circumstances such that life threatening incidents can be dealt with first.

In some examples, the system is configured to deploy autonomous drone and/or to analyse autonomous drone surveillance. The system deploys drones to provide surveillance, rapid assessment, and support during incident events such as fire incidents or intrusion events. The drones may assess the situation, monitor the progress of efforts, locate trapped individuals, and deliver critical supplies to remote or inaccessible areas. They enhance emergency response capabilities and save valuable time in critical situations.

Real-time incident data may be obtained using the autonomous drone or fleet of autonomous drones equipped with one or more of: sensors, cameras, communication devices, and payload systems. In some examples, the sensors on each drone may include thermal cameras for detecting heat signatures, LiDAR for mapping and navigation, smoke detectors, gas sensors to detect dangerous gases, and optical zoom cameras for detailed surveillance. The drones can be additionally equipped with communication systems that allow them to communicate with and send real-time data to the real-time incident data module, as well as with each other. This includes radio transceivers and antennas for long-range communication and Wi-Fi for short-range communication.

Suppose there is a large-scale fire in a multi-story building in an urban area. The fire is spreading rapidly, and there are reports of people trapped on the upper floors. As the fire is detected, autonomous drone surveillance is activated by the system. A fleet of drones is dispatched to the location of the incident by the system. The drones use GPS and LiDAR to navigate quickly to the location while avoiding obstacles. On arrival, the drones use their thermal cameras to map the intensity and spread of the fire within the building. This data is sent back in real-time to the real-time incident data module of the system. The system will then analyse the real-time data and can indicate which parts of the building are most dangerous and where firefighters should focus their efforts. In one example a drone, equipped with an optical zoom camera, spots a person waving for help from a window on an upper floor. The drone communicates this information back to the real-time incident data module, along with the exact location of the individual.

When gathering real-time data, the drones may include a payload system which allows drones to carry and deliver small loads, such as first aid kits, fire extinguishing capsules, or communication devices to trapped individuals. A drone equipped with a payload system may deliver a package through the window containing a small fire extinguisher, a first aid kit, and a communication device. The trapped person uses the communication device to speak to emergency responders, who guide them on how to stay safe until they can be reached. Meanwhile, the real-time data from the drones helps the firefighters to strategize the firefighting efforts more effectively, preventing the fire from spreading to nearby buildings and eventually extinguishing it.

In some examples, the drones are equipped with high-capacity batteries and a power management system that optimizes energy usage to maximize flight time. In some examples, the system is further configured for autonomous navigation of the drones. The drones may comprise a GPS module for location tracking, obstacle avoidance sensors, and algorithms for path planning. Though the drones are autonomous, human operators may take control of the drones if needed.

The drones may carry out data analyse of the real-time data captured in real-time using an onboard data processor comprising the relevant modules, enabling quick decision-making and response. The onboard data processor may be configured to analyse the real-time data using any of the method described herein.

As such, autonomous drone surveillance plays a vital role in assessing the incident events quickly, locating trapped individuals, providing them with immediate support, and assisting firefighters in containing and extinguishing the fire, ultimately saving lives and property.

The system may be configured to obtain traffic data. Such data may be obtained using sensors monitoring roads, GPS trackers on vehicles or mobile devices, and/or cameras to monitor the traffic conditions in real-time. In this way, the traffic data may indicate traffic jams, road closures, and the best available routes for emergency vehicles.

The system can use algorithms to analyse the real-time traffic data and dynamically adjusts traffic signals in real-time to create a clear path for emergency vehicles. For example, traffic lights can be turned green to allow emergency vehicles to pass through intersections without delay.

This system may further be configured to allow for the control of roadside electronic signs to provide real-time information to other road users. It can be used to indicate the approach of emergency vehicles and suggest alternative routes for regular traffic.

Moreover, the monitoring and adaptation module can utilise machine learning algorithms to recommend the fastest and most efficient routes for emergency vehicles. The algorithm can take into account current traffic conditions, road closures, and other factors. As such, the module can communicate directly with GPS systems in emergency vehicles, providing them with the optimized routes and traffic information in real time. The module may send alerts to drivers' smartphones or in-car systems, informing them of an approaching emergency vehicle so they can make way.

By carrying out the above, the module ensures efficient movement, minimizes congestion, and enables quicker response times for emergency personnel.

The system can also include a public alert module. A public alert module included in the system utilises cell broadcast technology to send location-based mass messages to all mobile devices or user devices in a specified area without the need for any application to be downloaded onto a user device. This ensures that messages are sent quickly and efficiently, even when the network is congested. The public alert module can create virtual perimeters for real-world geographic areas.

When an incident occurs, geofencing may be used by the public alert module to define the vicinity around the incident where notifications need to be sent. The public alert module allows authorised personnel can create and customize the content of the public service announcement. This includes adding details of the incident, any necessary actions to be taken, and contact information for emergency services. Notifications may be sent in multiple languages to cater to the linguistic diversity of the area. This ensures that the message is understandable to a larger group of recipients. This may be integrated with national or local emergency alert systems to ensure that it complies with regulations and reaches a broad audience. The system may be adapted such that only authorised personnel can send notifications. This prevents misuse of the platform by requiring authentication such as passwords, tokens, or biometrics. The public alert module can collect data on the delivery of the notifications, such as how many devices received the message and in which areas, to analyse the effectiveness and reach of the broadcast.

In a scenario where a fire breaks out in a shopping mall due to a gas leak. The fire is spreading rapidly and poses a threat to both the people inside the mall and the surrounding area. An authorized emergency response official, upon being alerted to the fire, accesses the public alert module to send a location-based message. They create a notification message advising people to evacuate the shopping mall and surrounding buildings immediately. They also provide a contact number for emergency services and request people to report any trapped or injured individuals. They can also set a virtual perimeter around the shopping mall that covers the surrounding buildings as well.

They can interface with the system to send messages to all mobile devices within the geofenced area. The message can be sent in several languages common to the residents in the area. As the notification is sent, residents and visitors in the vicinity receive the message on their mobile phones without the need for any specific app. People in the shopping mall start to evacuate orderly, and residents in surrounding buildings also begin to move to safety. A person in a nearby building, upon receiving the notification, spots someone waving for help from a window of the shopping mall. They immediately call the emergency services contact provided in the notification to report this. The emergency services, already on their way, use this information to execute a targeted rescue mission.

The system may generate dynamic response plans. The response plan can be based on the analysed historical data, attributes of the responder and the identified incident event. The response plan may be generated by the monitoring and adaptation module that is further configured to coordinates the deployment of resources, such as fire suppression systems and emergency services, to contain fires or address intrusions effectively. In this way, the response plan can leverage data from various sources to identify the most affected areas and optimise resource allocation during emergencies.

Specifically, to generate a dynamic response plan, the real-time data is first processed to discern the nature, location, and scale of the emergency. Information about the specifics of the emergency, such as the type of fire, the structure of the building, possible causes, the number of occupants, and other relevant information is particularly useful for generating the dynamic response plan. Further, obtaining real-time geospatial information aids to optimise routes for emergency responders to reach the location as quickly as possible.

Moreover, attributes of the responders obtained by the responder profiling module may pertain to their qualifications, authorizations, and permissions. In this way, the plan can be changed and adapted when there are changes in resource availability and competency.

As above, the system may run simulations to predict the progression of the emergency and recommend the best course of action to minimize damages and casualties. In a specific example, a fire may break in a high-rise building in a densely populated urban area. The system is activated and begins by collecting data from various sources. This real time data is analysed by an AI model trained on historical incident data to identify and understand the specifics of the fire. Firefighters with specialised training in high-angle rescues might be assigned the task of rescuing individuals trapped on higher floors.

The monitoring and adaption module responsible may be configured to coordinate the sequence and interaction of tasks, resources, and data according to a formal workflow model. This ensures streamlined execution and prevents bottlenecks or delays. As with the specific example above, the system might prioritize the deployment of firefighters to control the blaze while simultaneously dispatching medical teams to attend to injuries. The system will them provide the quickest routes for the emergency responders considering the current traffic conditions.

The monitoring and adaption module may be configured to collect feedback from deployed resources and responders for real-time adjustments to a plan. Suppose there is another fire incident nearby. The system can deploy nearby units to the new incident to minimise response time, even if they are not the most specialised for the task, while ensuring that the original scene is sufficiently addressed.

The system therefore provides enhanced emergency response system ensures a timely, effective, and well-coordinated response to fire outbreaks, significantly reducing the loss of life and property.

Once a responder has been assigned an incident event, virtual and augmented reality interfaces (VARIs) may be used by the responder. In this way, a system including a VARI can enhances situational awareness for emergency responders and system administrators. It allows visualization of real-time information, such as fire locations, intrusion points, and potential hazards. The system enables more effective decision-making, coordination, and command in emergency situations, ultimately leading to more efficient emergency responses.

The VARI may be an augmented reality (AR) headset. Emergency responders can wear these headsets to see a 3D environment with data overlay, which provides them with real-time situational awareness. For off-site monitoring, VARI includes a virtual reality (VR) control centre. System administrators and decision-makers can use VR headsets to immerse themselves in the 3D environment and make strategic decisions. The VARI is also capable of integration with smartphones and tablets. This allows for a more accessible and portable way to access the augmented reality features. VARI facilitates real-time communication between on-site emergency responders and off-site control centres, enabling coordinated efforts.

The virtual and augmented reality interfaces use Geographic Information Systems (GIS) and building information models (BIM) to create 3D models of the environment, which can include interiors and exteriors of buildings, roads, and critical infrastructure. The real-time data collected by the system can then be overlaided on the 3D environment. This data can include temperatures, smoke concentrations, the locations of individuals, and the statuses of doors and windows (open or closed), obtained from cameras or sensors. Users interacting with the 3D environment through AR or VR can use gesture controls or voice commands to manipulate the view, access data, or communicate with other team members.

Once a task is complete, the system may obtain feedback to use for learning and improving future responses.

In real-life scenarios, the assigned responder may struggle to find the location of an incident due to a lack of information on the exact coordinates. This has led to a significant increase in response time, causing a delay in providing aid to those in need. This problem is particularly acute in large cities or wide areas, where response vehicles are required to navigate through congested roads and traffic to reach the location of the incident.

Therefore, in some examples, at least a portion of the system may be embedded within panels of a building. In some examples, the system is specifically engineered to reside within or be in communication with panels of buildings, enabling local subsystems to make autonomous and swift decisions during emergencies without dependence on a central authority or network. In this way, an identified incident event can be pinpointed to a particular location, such as a room, in a building based on the location of the panel. This is another way of reducing the time taken for responding officers to reach the site of an alarm. This autonomy ensures an expedited and effective response, crucial during emergencies like fires or intrusions. Further, this ensures swift response at a local level while the system coordinates a comprehensive solution.

Miniaturised processing chips or processing units can be within an addressable alarm panel may be configured to execute any of the methods mentioned herein. As such, the alarm panel is capable of processing data from sensors and executing decisions autonomously in real-time, mitigating any reliance on a central hub. The addressable alarm panels may further comprise built-in data storage to store and retain historical incident and data pertinent to their specific location in the target environment. This allows for instantaneous access to data, facilitating swift decision-making. The addressable alarm panels may further include a battery backup system ensuring that the system remains operational even in the event of power failure.

The processing chips can interface with a network of sensors (such as smoke detectors, motion sensors) and actuators (like sprinklers, door locks) connected to the addressable alarm panel. Sensors furnish data, while actuators perform actions based on decisions made by the embedded processing units. By employing an independent and secure communication protocol that facilitates data exchange between the sensors, actuators, and embedded processing units within the panel, the system can operate autonomously.

FIG. 7 illustrates the workflow in the case of an alarm being triggered by the addressable alarm panel. Upon the triggering of an alarm event, the alarm event is initially validated as illustrated in FIG. 4 to ensure the event and zone codes are valid, and the triggered alarm is not a false event. If unable to verify, the alarm can be processed either manually or through an IVRS system to confirm the alarm event as illustrated in FIG. 5.

The system offers API access to the software, allowing for seamless integration with other systems. This opens up the possibility of integrating with other security systems such as access control systems and video surveillance systems. This integration can result in a more comprehensive security solution, as the network system can provide a unified view of all security incidents and events.

As such, in some examples, after validation of the alarm event, the system automatically accesses the CCTV cameras paired to the panel, for example, through the use of APIs. If no cameras are integrated into this network, the system can be configured to access other third-party CCTV networks to get a feed from cameras in the vicinity of the location to verify the alarm.

The processing units within the alarm panels are programmed with algorithms (as described in herein) that analyse the historical data and can make autonomous decisions based on predefined criteria and the real-time data obtained by the sensors/actuators. These algorithms are designed to identify various emergency scenarios. Therefore, in the case the alarm is verified, and an incident event is identified through the data obtained from cameras, the system can automatically initiate an assignment of a responder based on the nature of the incident event.

However, if the system is unable to confirm an incident using the cameras, the system initiates communication with the contacts assigned to the addressable alarm panel. This includes sending out an email and an SMS to, for example, the concerned persons in charge of the security for the client, known as security managers, and calls to the primary and secondary contacts assigned to the specific panel. If the calls are not attended, the system automatically assigns and responder to the incident location. The contacts are mapped to each of the panels into the software while connecting the panels to the network initially. The panels are connected digitally using IP/GSM, providing a secure and reliable connection.

The panels also allow for the quick and efficient sharing of information between the panels and a central command centre, and can provide real-time updates on the status of the incident. In real life scenarios, the ability to integrate and share information with other available legacy systems can vastly improve response times in emergency situations. For example, if a fire alarm is triggered, the network system can automatically send the incident information from its own panels, but the fire can also destroy the equipment in the network, wherein integration with any other available networks in the incident area through the software can add valuable information which can be sent to the nearest fire trucks for faster response. This can help save valuable time in a life-threatening situation, potentially saving lives and property.

To ensure the security of the network, cybersecurity measures can be employed. This may include firewalls, encryption, and secure socket layer (SSL) protocols to ensure the confidentiality and integrity of the data transmitted over the network. This is advantageous as cyber-attacks are becoming more sophisticated and frequent. The network system ensures that users can trust the system to protect their valuable information and assets.

In some examples, the addressable alarm panels are equipped with an interface that allows users and local administrators to interact with the system. This interface may display real-time data, system status, and allows for manual overrides if necessary.

In a specific example, a fire may erupt in a building. The smoke detectors in the server room immediately send signals to the embedded processing unit in the panel on the same floor. The processing unit autonomously identifies this as a potential fire situation and, without waiting for any central command, activates the fire suppression system within the server room. Simultaneously, it sends out audible alerts and instructions for evacuation through the panel's HMI and the building's PA system.

The panel can also send commands to the elevators to move to a safe floor, and doors are unlocked for ease of evacuation. Emergency lighting is activated, guiding occupants toward the safest exit routes. While the system is taking immediate actions, it also communicates the situation to a central system. In this case, the system, residing within the panels, acted autonomously and promptly to contain the fire and facilitate the evacuation, substantially mitigating the risk to life and property. This swift local action provided crucial time for occupants to evacuate safely and minimized damage to the building. In some examples, co-ordinates of the panel are sent to a mobile application which responding officers have access to. In this way, responders can act fast to reach the scene of the incident.

Some older panels that cannot be traced using GPS directly may already be installed into the building. In such an example, a central database can store location data of the panels, which is manually entered by the user when the panel is installed. Typically, panels provide a standardised string output relating to the sensors connected to the panels (e.g. zone and alarm type). A database stores an association between an alarm zone and stored panel location. More recent panels expose an API endpoint.

An IP connection is preferred to connect the panels to the network; however GSM can also be used. An IP connection is secure, and also further reduces latency in the network, since the panel is directly connected to the network, rather than being connected to the network via an intermediate Rx node.

The invention claimed is:

1. A method for dispatching emergency responders, the method comprising
obtaining, by one or more processors, responder profiling data comprising attributes of a plurality of responders, the attributes comprising respective locations of the responders;
obtaining, by the one or more processors from one or more monitoring devices, real-time incident data derived from monitoring a target environment, the real-time incident data comprising an indication of a current condition of the target environment;

obtaining, by the one or more processors, historical incident data comprising an indication of at least one warning condition of the target environment, the warning condition being a past condition at which a past incident event occurred;

identifying, by the one or more processors, a current incident event in the real-time incident data using a machine learning model, the machine learning model correlating the current condition with the warning condition of the target environment;

identifying, by the one or more processors in response to the current condition correlating with the warning condition, a location of the current incident event based on receiving a unique identifier from an addressable panel arranged in the target environment and comparing the unique identifier to a plurality of unique identifiers in a database comprising locations of addressable panels and associated unique identifiers;

extracting, by the one or more processors, current incident data comprising information about the current incident event from the real-time incident data using the machine learning model, the machine learning model filtering out irrelevant data from the real-time incident data;

assigning, by the one or more processors, according to the responder profiling data, the location of the current incident event, and the current incident data, a responder to the current incident event using the machine learning model based on the location of the current incident event and the respective locations of the responders, the machine learning model matching the information about the current incident event with the attributes of the responders;

generating, by the one or more processors, according to the current incident data, a response plan comprising a workflow model for the assigned responder using the machine learning model, the workflow model comprising a sequence of one or more tasks and one or more resources for the assigned responder;

obtaining, by the one or more processors from the one or more monitoring devices, feedback from the assigned responder as the responder is addressing the current incident event at the target environment; and updating, by the one or more processors, according to the feedback, the assigned responder and the response plan using the machine learning model.

2. The method according to claim 1, further comprising:
assigning, by the one or more processors, a past incident event type to the warning condition based on at least a characteristic of the past incident event; and assigning, by the one or more processors, a current incident event type to the current incident event based on the past incident event type assigned to the warning condition;

wherein the responder is assigned based on the current incident event type.

3. The method according to claim 1, wherein the attributes of the responders profiling data comprise at least one of: a skill level of the responder; an experience level of the responder; an availability status of the responder; a type of emergency responder; a distance of the responder from the target environment; equipment available to the responder; qualifications of the responder; authorisations of the responder; or permissions of the responder.

4. The method according to claim 1, wherein:
the attributes of the responders comprise an availability status of the responders; and the method further comprises updating, by the one or more processors, the availability status of the responders automatically in real-time.

5. The method according to claim 1, wherein obtaining the real-time incident data further comprises obtaining at least one of video data of the target environment or sensor data of the target environment.

6. The method according to claim 5, wherein obtaining the real-time incident data further comprises obtaining social media data relating to the current incident event.

7. The method according to claim 1, wherein the real-time incident data is obtained using an Application Programming Interface (API).

8. The method according to claim 1, wherein the one or more monitoring devices comprise an autonomous drone.

9. The method according to claim 1, wherein obtaining the historical incident data further comprises obtaining at least one of historical video data of the target environment or historical sensor data of the target environment.

10. The method according to claim 1, further comprising:
identifying, by the one or more processors, a false incident condition of the target environment from the historical incident data using the machine learning model, the false incident condition being a past condition at which an incident event was falsely identified; and identifying, by the one or more processors, a false incident event in the real-time incident data using the machine learning model, the machine learning model correlating the current condition with the false incident condition of the target environment.

11. The method according to claim 1, wherein the machine learning model matches the location of the current incident event to the locations of the responders in assigning the responder to the current incident event.

12. The method according to claim 1, further comprising identifying, by the one or more processors, a presence of an intruder in the target environment.

13. The method according to claim 12, further comprising:
assigning, by the one or more processors, an identity of an intruder to the intruder using the machine learning model; and alerting, by the one or more processors, the assigned responder to the identity of the intruder.

14. The method according to claim 1, further comprising obtaining, by the one or more processors, traffic data, wherein the responder is assigned based on the traffic data.

15. The method according to claim 1, further comprising determining, by the one or more processors, an importance of the current incident event relative to other incident events, wherein the responder is assigned based on the determined importance.

16. The method according to claim 1, further comprising monitoring, by the one or more processors, progress of the assigned responder based on the feedback from the assigned responder.

17. The method according to claim 1, further comprising sending, by the one or more processors, an alert to the assigned responder including at least a portion of the current incident data.

18. The method according to claim 1, further comprising generating, by the one or more processors, one or more reports comprising analytics of an incident event response to the current incident event.

19. The method according to claim 1, further comprising sending, by the one or more processors, an alarm message to user devices, the alarm message comprising at least a portion of the current incident data.

20. A system for dispatch of emergency responders, the system comprising one or more processors configured to:
- obtain responder profiling data comprising attributes of a plurality of responders, the attributes comprising respective locations of the responders;
- obtain, from one or more monitoring devices, real-time incident data derived from monitoring a target environment, the real-time incident data comprising an indication of a current condition of the target environment;
- obtain historical incident data comprising an indication of at least one warning condition of the target environment, the warning condition being a past condition at which a past incident event occurred;
- identify a current incident event in the real-time incident data using a machine learning model, the machine learning model correlating the current condition with the warning condition of the target environment;
- identify, in response to the current condition correlating with the warning condition, a location of the current incident event based on receiving a unique identifier from an addressable panel arranged in the target environment and comparing the unique identifier to a plurality of unique identifiers in a database comprising locations of addressable panels and associated unique identifiers;
- extract current incident data comprising information about the current incident event from the real-time incident data using the machine learning model, the machine learning model filtering out irrelevant data from the real-time incident data;
- assign, according to the responder profiling data, the location of the current incident event, and the current incident data, a responder to the current incident event using the machine learning model based on the location of the current incident event and the respective locations of the responders, the machine learning model matching the information about the current incident event with the attributes of the responders;
- generate, according to the current incident data, a response plan comprising a workflow model for the assigned responder using the machine learning model, the workflow model comprising a sequence of one or more tasks and one or more resources for the assigned responder;
- obtain, from the one or more monitoring devices, feedback from the assigned responder as the responder is addressing the current incident event at the target environment; and
- update, according to the feedback, the assigned responder and the response plan using the machine learning model.

21. The system according to claim 20, wherein the one or more monitoring devices comprise an autonomous drone.

22. The method according to claim 1, wherein the real-time incident data is obtained by accessing a third-party system.

23. The method according to claim 22, wherein the third-party system comprises at least one of: a CCTV system arranged in the target environment; or a social media platform.

24. The method according to claim 22, wherein accessing the third-party system comprises using at least one of one of: an Application Programming Interface (API) to interact with the third-party system; tokenization to substitute sensitive data from the third-party system with equivalent non-sensitive data; or an alarm string validator to detect false alarms of the third-party system.

* * * * *